United States Patent

[11] 3,625,757

[72] Inventors Albert Edward Wiehe;
Lowell W. Mott, both of Troy, Ohio
[21] Appl. No. 818,722
[22] Filed Apr. 23, 1969
[45] Patented Dec. 7, 1971
[73] Assignee Hobart Brothers Company
Troy, Ohio

[54] COATED CONSUMABLE GUIDE TUBE FOR ELECTROSLAG WELDING
10 Claims, 5 Drawing Figs.
[52] U.S. Cl. .................................................. 117/202, 148/26, 219/73, 219/146
[51] Int. Cl. ..................................................... B23k 9/18, B23k 35/22
[50] Field of Search............................................ 117/202; 148/26; 219/73, 74, 146

[56] References Cited
UNITED STATES PATENTS
2,868,951 1/1959 Shrubsall...................... 219/74
3,352,993 11/1967 Suzuki et al. .................. 219/73
FOREIGN PATENTS
227,057 4/1963 Australia...................... 219/73
1,117,818 3/1956 France ......................... 148/26
39/1327 2/1964 Japan .......................... 219/73
129,762 3/1959 U.S.S.R. ....................... 148/26

Primary Examiner—William L. Jarvis
Attorney—Marechal, Biebel, French & Bugg

ABSTRACT: A consumable guide tube for use in electroslag welding includes a coating which, when heated, forms a conductive molten flux having a composition such that relatively long welds in confined areas may be made with the physical properties of the resultant weld being substantially constant throughout the length of the weld. The flux contains titanium dioxide, potassium oxide, and sodium oxide.

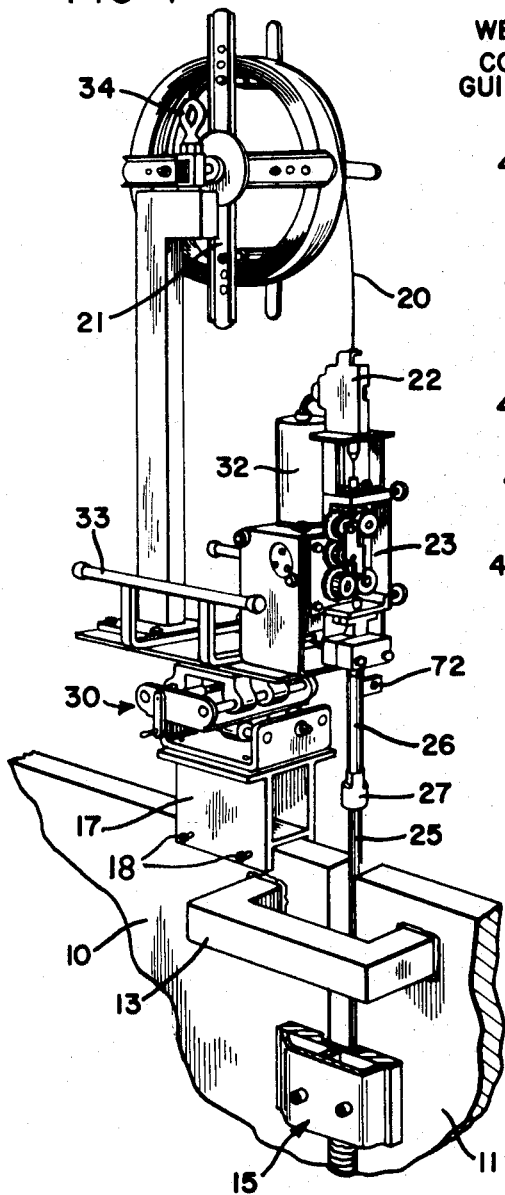
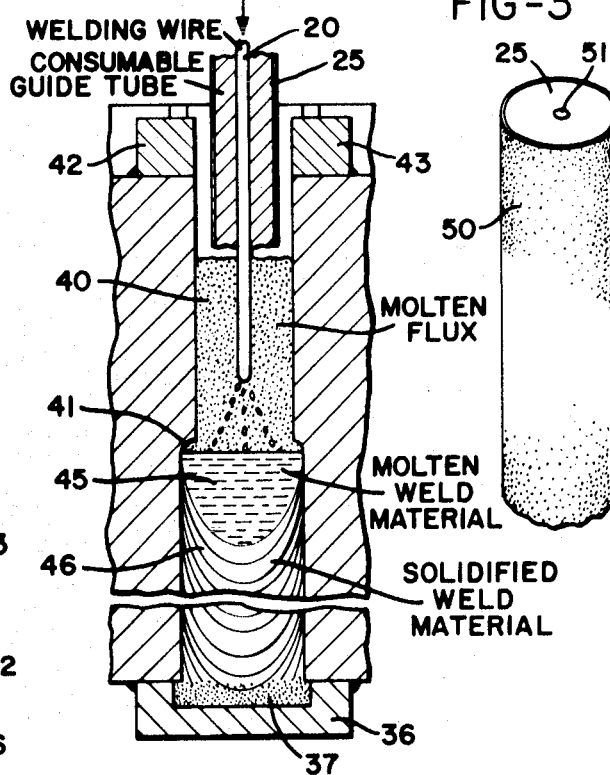
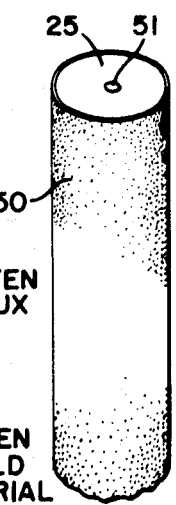
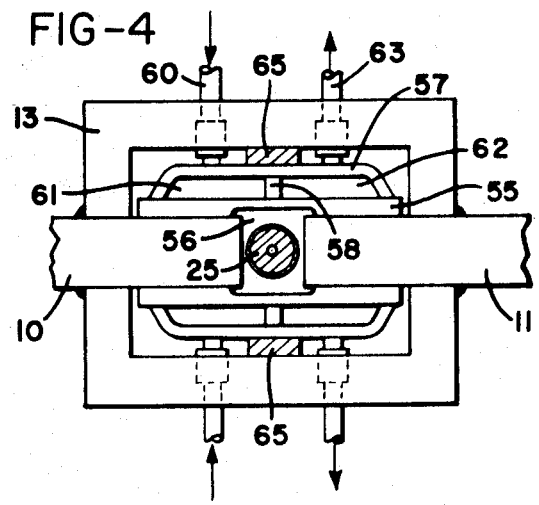
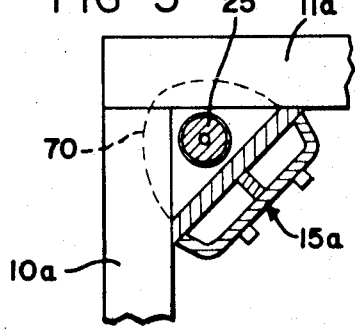
INVENTORS
ALBERT EDWARD WIEHE &
LOWELL W. MOTT
BY
Marshall, Biebel, French & Rugg
ATTORNEYS

COATED CONSUMABLE GUIDE TUBE FOR ELECTROSLAG WELDING

BACKGROUND OF THE INVENTION

The electroslag welding process is particularly adapted for use in welding plates having substantial thickness by filling the space between the plates with molten metal while at the same time melting a portion of each plate.

Welding wire is fed into the space between the plates through a centrally positioned guide tube and a flux forming composition is added. In its molten state, the flux acts as a heat insulator to concentrate the heat of the weld to the weld puddle. The flux further functions to prevent air from oxidizing the metals in the molten puddle.

The flux composition is a poor conductor of electricity in its nonmolten state, however, when an arc is struck between the welding wire and the metal plates, enough heat will be generated to melt the flux, as well as the wire, and the flux then becomes sufficiently conductive to engulf and extinguish the arc. Electrical current through the molten flux thereafter causes sufficient heating to maintain the flux molten and to melt the welding wire as it is fed into the welding area, as well as adjacent portions of the plate. The guide tube also melts as the weld rises and furnishes additional metal to the pool.

Water-cooled shoes, usually made of copper, are placed against the plates to contain the molten weld metal and flux. Since the shoes are cooled, a part of the flux from the molten pool will be solidified and thus removed. Some means must therefore be used to replace this lost flux so that the proper amount of flux is maintained throughout the duration of the weld. One technique is to add flux composition manually at periodic intervals. It has also been proposed to coat the consumable guide tube with a fluxing material so that as the weld rises, sufficient flux composition will be added to the pool to compensate for that lost by freezing. One such coated consumable guide tube is shown in U.S. Pat. No. 2,869,951.

It has been noted, however, that in those welding situations where the welding area is restricted, such as in vertical fillet welds, it has been physically impossible to produce long welds, in the order of 4 to 6 feet, using the electroslag welding process and prior art flux compositions or with those compositions currently employed with coated consumable guide tubes. This is primarily due to changes in the electrical conductivity properties of the flux as the composition of the flux changes which causes, among other things, changes in the amount of heat generated in the weld.

In large welds, distribution of heat can be controlled by oscillating the guide tubes, such as done in U.S. application Ser. No. 738,599, filed June 20, 1968, now Pat. No. 3,518,397, assigned to the same assignee as the present invention. However, in small welds, heat distribution is dependent almost entirely on the conductivity, mobility and fluidity of the flux. If conductivity changes due to the uneven removal of compounds through freezing and other chemical changes, the quality of the weld will also vary as the weld progresses. Thus, the composition of the flux must be carefully chosen if a weld of consistent high quality is to be obtained throughout its length.

SUMMARY OF THE INVENTION

This invention relates to an improved coating on a consumable guide tube which contains compounds permitting relatively long welds to be made in restricted areas.

The composition of the coating of this invention has electrical characteristics which cause a controlled amount of heat to be generated within a relatively small volume of flux material to melt a portion of the plates being welded, the consumable guide tube as the weld rises, and the welding wire which is fed through the guide tube. The flux composition also provides the necessary ion mobility and fluidity to the flux above the pool of molten metal to insure uniform distribution of heat. Such a coating thus produces a uniform quality of weld throughout its length.

The coating also functions as an insulator between the consumable guide tube and the edges of the plates being welded and the shoes so that inadvertent short circuiting will not occur.

The flux, in a preferred embodiment, contains 0.75 to 1.55% $K_2O$ and 2.5 to 3.1% $Na_2O$. These compounds are quite valuable in producing fluidity, consistency of electrical conductivity and the additional penetration into the plates being welded, all of which are required to make sound welds in small cross-sectional areas, i.e., in areas of less than 1½ square inches. The welding wire supplied through the consumable guide tube carries with it sufficient silicon and manganese to provide the weld quality needed for this type of welding.

Accordingly, it is an object of this invention to provide an improved coating for a consumable guide tube for use in electroslag welding in small cross-sectional areas which produces welds having uniform physical characteristics throughout their length; to provide a flux compound which has consistent electrical properties thus providing a controlled amount of heat to the weld, the flux material being added to the molten weld pool at substantially the same rate as the flux is removed from the pool by solidification against the water cooled retaining shoes; to provide a coating for consumable guide tubes which allow welds of from 4 to 6 feet to be formed having homogeneous physical properties; and to provide a coating for a consumable guide tube which, while in the nonmolten state, electrically insulates the tube against short circuiting.

Other objects and advantages of the invention will be apparent from the following description, the accompanying drawings and the appended claims.

BRIEF DESCRIPTION OF THE DRAWINGS

FIG. 1 is a perspective view showing a typical electroslag application;

FIG. 2 is a cross-sectional view showing the consumable guide tube, and the welding wire extending into the molten flux and weld metal formed between the plates being welded;

FIG. 3 is a perspective view of a consumable guide tube having the coating of this invention applied to the exterior thereof;

FIG. 4 is a plan view showing the water-cooled shoes mounted on each side of the weld joint to contain the molten flux and metal, and also showing in cross section the consumable guide tube; and FIG. 5 is a plan view showing the relationship of the consumable guide tube and water-cooled shoe when making a fillet weld.

DESCRIPTION OF THE PREFERRED EMBODIMENT

In FIG. 1, a pair of plates 10 and 11 are to be butt-welded and are temporarily held relative to each other by a plurality of brackets 13, one of which is shown. These brackets not only hold the plates securely during welding, but also assist in holding the water-cooled shoes 15, as will be explained in more detail later. The brackets 13 are removed after the plates have been welded.

The electroslag welding apparatus includes a frame 17 which is placed on top of one of the plates 10 and secured by screws 18. Welding wire 20 from a reel 21 is mounted on the frame 17 and is fed through a wire straightening mechanism 22 and a wire feeder 23 to an opening in the interior of a consumable guide tube 25. The consumable guide tube 25 is releasably mounted on an extension 26 of the wire feeding mechanism by a chuck 27 and, as shown in FIG. 1, is centrally positioned between and extends vertically downwardly into the space between the plates 10 and 11. A positioning mechanism, shown generally at 30, allows the guide tube to be so aligned.

A motor 32 drives the wire feeder mechanism 23 at a rate determined by an external control circuit, not shown. The rate at which the wire is fed into the weld will determine, in part, the welding current.

The electroslag apparatus also includes handles 33 by which it may be manually placed or guided onto the plate 10, and a lifting hook 34 which allows the apparatus to be lifted mechanically. A reel 21 of welding wire normally weighs approximately 60 pounds and can be lifted in place manually by the machine operator. It has been found that the electroslag welding process cannot be stopped and restarted satisfactorily, and therefore if more than 60 pounds of wire is required to complete the weld in a single operation, a larger reel would be provided.

In FIG. 2, the consumable guide tube 25 is shown positioned centrally between the plates 10 and 11, and the welding wire 20 is fed downwardly through the guide. In a typical installation, a starting dam 36 is temporarily welded at the bottom of the weld and includes a recess 37 which accommodates flux added at the time the weld is started. This dam 36 and that portion of the flux remaining in the recess will be removed after the weld has cooled.

To start the weld, the welding wire 20 is fed downwardly through the guide tube 25 and an arc is established between the welding wire 20 and the dam 36. Heat is thus generated melting the flux which then becomes conductive and engulfs the arc. Thereafter, the heat generated in the weld is due to resistance heating as current flows through the molten flux. As the weld rises, the consumable guide tube will also be melted and will supply additional metal to the weld. The flux or slag material 40, as shown in FIG. 2, will be in the molten state throughout the welding process.

Sufficient heat is generated not only to melt the welding wire 20 and the consumable guide tube 25 but also to melt portions of the plates 10 and 11, as shown at 41 in FIG. 2. This assures a strong bond between these plates. Thus, as the weld rises, the consumable guide tube 25 is consumed and no vertical movement of the guide tube is necessary. Molten metal from the welding wire 20, the consumable guide 25, and the plates 10 and 11 is shown at 45 and this solidifies at 46 to form the weld.

Runoff blocks 42 and 43 are shown in FIG. 2 which permit weld material to solidify above the top surface of the plates 10 and 11. These runoff blocks are later removed and the weld is ground flush with the top surface of the plates.

As the weld rises, a portion of the flux solidifies due to the cooling effect of the water-cooled shoes and therefore this flux material must be replaced constantly to compensate for this loss. Accordingly, one of the features of this invention is to coat the consumable guide tube 25 with a flux material 50 in sufficient quantity that the amount of flux material is maintained constant throughout the welding operation. It is also essential that this flux material 50 be of such composition that the electrical resistance of the molten flux remain constant so that the heat generated throughout the weld remains constant and thus allow a weld of uniform quality to be established throughout its length. It is also essential that the composition of the flux provide the proper convection current to allow the even distribution of heat throughout the welding area.

In FIG. 3, a consumable guide tube 25 is shown having a coating 50 on the exterior surface thereof. The guide tube is provided with an opening 51 typically one-eighth inch in diameter, which is slightly larger than the diameter of the welding wire 20 thus allowing the welding wire to pass freely into the welding area.

In FIG. 4, the water-cooled shoes are shown mounted adjacent the joint between the plates 10 and 11. These shoes are preferably formed from a copper plate 55 which has a centrally located relief 56 to permit flux to solidify adjacent the plate 55 and still be outside a line joining the outer edges of the plates 10 and 11. After the shoes are removed, the solidified flux can be removed. Without this relief 56, the weld would be concave after the flux was removed.

Each shoe has an outer casing 57 and includes a barrier 58 which extends vertically substantially the entire length of the shoe. Water from a circulating unit, not shown, flows through a pipe 60 into a chamber 61 formed by the plate 55, the outer casing 57 and the barrier 58, and flows upwardly, across into the chamber 62 and then downwardly and exits through pipe 63. Therefore, cooling water is in direct contact with the plate 55 and prevents this plate from being fused to either the plates 10 and 11 or to the molten weld material in the joint between the plates.

It is also possible to use massive copper blocks in those instances where water-cooled plates are impractical, however, this adds to the cost of the retaining shoes.

The water-cooled shoes 15 may be held in place by wedges 65 which are driven between the outer casing 57 and the brackets 13. In a typical installation, the water-cooled shoes 15 are approximately 18 inches in length. A plurality of shoes are used, with one shoe being placed on top of the other as the weld progresses upwardly. Thus, as the weld metal solidifies, the lower shoe can be removed and placed above the upper shoe.

FIG. 5 shows a fillet weld where plates 10a and 11a are joined together. A single water-cooled shoe 15a contains the molten weld material. The dotted line 70 defines the depth to which plate material is melted during the course of the welding.

The guide tube 25 is preferably formed from mild steel and has a one-half inch outside diameter and a one-eighth inch inside diameter. For welding relatively long welds, i.e., 5 feet, in restricted areas, the guide tube is made in 5-foot lengths and is coated with a flux 50 which contains, when melted, the following ingredients

|  | Preferred | Range |
|---|---|---|
| $SiO_2$ | 17.20% | 15.80–19.40% |
| $TiO_2$ | 31.27% | 28.50–32.00% |
| CaO | 11.27% | 10.50–12.50% |
| MgO | 4.25% | 3.90–4.60% |
| $CaF_2$ | 31.38% | 28.00–34.50% |
| FeO | 0.16% | 0.00–0.40% |
| $ZrO_2$ | 0.47% | 0.47–0.54% |
| $K_2O$ | 1.16% | 0.80–1.30% |
| $Na_2O$ | 2.82% | 2.50–2.90%. |

This composition is especially useful when welding in restricted areas (i.e., less than 1½ square inches) since it provides the necessary mobility and fluidity to the flux above the molten metal and allows the necessary distribution of heat. The conductivity of this flux also remains relatively constant throughout the length of the weld.

This composition, as a practical matter, is formed from the following commercially available materials:

| Rutile (milled, fine grind grade | Preferred Parts | Range |
|---|---|---|
| 92% min. $T_iO_2$, 1.6% max. $ZrO_2$, 1.5% max. $S_iO_2$ | 40.0 | 35.0–43.0 |
| Fluorspar (200 mesh—acid grade, 97% $CaF_2$ min) | 40.0 | 35.0–43.0 |
| Wollastonite (medium fiber grade) 97% $CaSiO_3$ | 15.0 | 13.7–16.3 |
| Sodium CMC (slipping agent) | 1.5 | 1.4–1.6 |
| Dolomite 52–55% $CaCo_3$ 44–46% $MgCO_3$ | 24.0 | 21.9–26.1 |
| Sodium silicate 3.2 $SiO_2$: 3.3 $Na_2O$ | 32.0 | 31.0–34.0 |
| Potassium silicate 2.05 $SiO_2$:1 $K_2O$ | 10.0 | 9.0–11.5 |
| Water | 0.5 | 0.4–1.0 |
| Potassium hydroxide | 0.25 | 0.2–0.3 |

For shorter welds, up to 12 to 18 inches in confined areas, a second composition as set forth below has been found useful:

|  | Preferred | Range |
|---|---|---|
| $CaF_2$ | 57.05% | 53.6–60.6% |
| $SiO_2$ | 23.05% | 22.0–24.0% |
| CaO | 11.50% | 11.0–12.0% |
| MgO | 2.82% | 1.7–2.95% |

| | | |
|---|---|---|
| MnO | 1.66% | 1.6–1.72% |
| K₂O | 1.15% | 0.75–1.55% |
| Na₂O | 2.77% | 2.5–3.1%. |

This composition does not contain any titanium dioxide, however, it does retain the sodium oxide and potassium oxide which imparts the necessary mobility, fluidity, and electrical conductivity to the molten flux.

This second composition, as a practical matter, is formed from the following commercially available materials:

| | Preferred | Range |
|---|---|---|
| Fluorspar (40 mesh-acid grade, 97% CaF₂ min.) | 40 | 35–45 |
| Fluorspar (200 mesh-acid grade, 97% CaF₂ min.) | 35 | 33–37 |
| Wollastonite [97% CaSiO₃] medium fiber grade | 20 | 18.7–21.3 |
| Silico manganese 1½ carbon max., 65–68% min., 18–20% Si | 2.5 | 2.3–2.7 |
| Ferro silicon (50% grade 46–52% Si) | 4.0 | 3.8–4.2 |
| Sodium CMC (slipping agent) | 1.5 | 1.4–1.6 |
| Dolomite 52–55% CaCO₃, 44–46% MgCO₃ | 17.5 | 16.0–17.0 |
| Sodium silicate 3.2 SiO₂:3.3 Na₂O | 32.0 | 31.0–34.0 |
| Potassium silicate 2.05 SiO₂:1 K₂O | 10.0 | 9.0–11.5 |
| Water | 0.5 | 0.4–1.0 |
| Potassium hydroxide (KOH) | 0.25 | 0.2–0.3. |

Either of the flux compositions identified above insulates the molten metal so that the heat can be properly distributed and further shields the molten metal from the atmosphere thus obviating the need for shielding gas. The thickness of the coating will depend upon the size of the consumable guide tube.

| Guide Tube Dimensions | Coating Thickness |
|---|---|
| 0.591 inch (one-half) | 0.0455 inch |
| 0.448 inch (three-eighths) | 0.073 inch |
| 0.398 inch (five-sixteenths) | 0.0855 inch |
| 0.340 inch (one-fourth) | 0.0900 inch. |

This coating thickness comprises from 8 to 12 percent by weight of the total guide tube.

The welding voltage is typically in the range of 35 to 45 volts, the current is from 400 to 650 amperes and the electrode wire feed rate is 250 inches per minute. Current is supplied through lug 72 on the extension 26, through the guide tube 25 to the welding wire 20 in the vicinity of the weld. Thus, substantially no current flows through the wire 20 until it exits the guide tube 25.

Using the coating compositions and weld parameters stated above, the following physical characteristics of the resultant weld are obtained:

| | |
|---|---|
| Yield | 27,000–49,000 p.s.i. |
| Tensile | 71,000–79,000 p.s.i. |
| % Elongation | 24–28. |

The coated consumable guide tube as described above has also been used in welding plates which make an angle of up to 45° to the vertical, thus giving this particular guide tube flexibility in the environment which it may be utilized.

The flux 50, in the nonmolten state as it appears on the guide tube acts as an insulator and thereby prevents the guide tube from short circuiting against one of the plates 10 or 11. This is particularly important when welding in confined areas where the clearances between the guide tube and the plates are small.

While the above identified coating has been found to be particularly useful in providing relatively long welds, that is, for welds in the order of from 4 to 6 feet, in relatively small areas, i.e. less than 1½ square inch, it is understood that some latitude in the composition is possible without departing from the scope of the invention.

While the compositions herein described constitute preferred embodiments of the invention, it is to be understood that the invention is not limited to these precise compositions and that changes may be made therein without departing from the scope of the invention.

What is claimed is:

1. An electrode for use in electroslag welding in confined areas which includes a mild steel consumable guide tube having a coating thereon including, as essential ingredients, SiO₂ and CaF₂, the improvement comprising the addition of K₂O, in the range from 0.75 to 1.55 percent, and Na₂O, in the range from 2.5 to 3.1 percent, to the coating composition in amounts sufficient to impart fluidity and consistency of electrical conductivity when welding in confined areas.

2. A coated consumable guide tube for use in electroslag welding including a mild steel tube having a coating thereon, said coating including CaF₂, SiO₂, CaO, MgO, the improvement comprising the addition of the following compounds in combination in the coating

| | |
|---|---|
| K₂O | 0.75–1.55% |
| Na₂O | 2.5–3.1%. |

3. The coated guide tube defined in claim 2 wherein said coating, when melted, includes the following ingredients:

| | |
|---|---|
| SiO₂ | 15.80–19.40% |
| TiO₂ | 28.50–32.00% |
| CaO | 10.50–12.50% |
| MgO | 3.90–4.60% |
| CaF₂ | 28.00–34.50% |
| FeO | 0.00–0.40% |
| ZrO₂ | 0.47–0.54% |
| K₂O | 0.80–1.30% |
| Na₂O | 2.50–2.90%. |

4. The coated guide tube defined in claim 2 wherein said coating, when melted, includes the following ingredients:

| | |
|---|---|
| SiO₂ | 17.20% |
| TiO₂ | 31.27% |
| CaO | 11.27% |
| MgO | 4.25% |
| CaF₂ | 31.38% |
| FeO | 0.16% |
| ZrO₂ | 0.47% |
| K₂O | 1.16% |
| Na₂O | 2.82%. |

5. The coating guide tube defined in claim 2 wherein said coating is formed from the following:

| | Parts |
|---|---|
| Rutile | 35.0–43.0 |
| Fluorspar | 35.0–43.0 |
| Wollastonite | 13.7–16.3 |
| Sodium (CMC) | 1.4–1.6 |
| Dolomite | 21.9–26.1 |
| Sodium silicate | 31.0–34.0 |
| Potassium silicate | 9.0–11.5 |
| Water | 0.4–1.0 |
| Potassium hydroxide | 0.2–0.3. |

6. The coating guide tube defined in claim 2 wherein said coating is formed from the following:

| | Parts |
|---|---|
| Rutile | 40.0 |
| Fluorspar | 40.0 |
| Wollastonite | 15.0 |
| Sodium (CMC) | 1.5 |
| Dolomite | 24.0 |
| Sodium silicate | 32.0 |
| Potassium silicate | 10.0 |
| Water | 0.5 |
| Potassium hydroxide | 0.25. |

7. The coated guide tube defined in claim 2 wherein said coating, when melted, contains the following ingredients:

| | |
|---|---|
| CaF₂ | 53.6–60.6% |
| SiO₂ | 22.0–24.0% |
| CaO | 11.0–12.0% |
| MgO | 1.7–2.95% |
| MnO | 1.6–1.72% |
| K₂O | 0.75–1.55% |
| Na₂O | 2.5–3.1%. |

8. The coated guide tube defined in claim 2 wherein said coating, when melted, contains the following ingredients:

| | | |
|---|---|---|
| SiO₂ | CaF₂ | 57.05% |
| | CaO | 23.05% |
| | MgO | 11.50% |
| | MnO | 2.82% |
| | K₂O | 1.66% |
| | Na₂O | 1.15% |
| | | 2.77%. |

9. The coated guide tube defined in claim 2 wherein said coating is formed from the following:

| | Parts |
|---|---|
| Fluorspar (40 mesh) | 35–45 |
| Fluorspar (200 mesh) | 33–37 |
| Wollastonite | 18.7–21.3 |
| Silico manganese | 2.3–2.7 |
| Ferro silicon | 3.8–4.2 |
| Sodium (CMC) | 1.4–1.6 |
| Dolomite | 16.0–17.0 |
| Sodium silicate | 31.0–34.0 |
| Potassium silicate | 9.0–11.5 |
| Water | 0.4–1.0 |
| Potassium hydroxide | 0.2–0.3. |

10. The coated guide tube defined in claim 2 wherein said coating is formed from the following:

| | Parts |
|---|---|
| Fluorspar (40 mesh) | 40 |
| Fluorspar (200 mesh) | 35 |
| Wollastonite | 20 |
| Silico manganese | 2.5 |
| Ferro silicon | 4.0 |
| Sodium (CMC) | 1.5 |
| Dolomite | 17.5 |
| Sodium silicate | 32.0 |
| Potassium silicate | 10.0 |
| Water | 0.5 |
| Potassium hydroxide | 0.25. |

* * * * *